Dec. 7, 1954

P. A. HERRENG

SIGNAL TRANSLATING APPARATUS FOR PULSE CODE TRANSMISSION SYSTEMS 2,696,555

Filed June 28, 1951

2 Sheets-Sheet 1

INVENTOR
PIERRE ALPHONSE HERRENG
BY:
Haseltine, Lake & Co.
AGENTS

Dec. 7, 1954

P. A. HERRENG
SIGNAL TRANSLATING APPARATUS FOR
PULSE CODE TRANSMISSION SYSTEMS 2,696,555

Filed June 28, 1951

2 Sheets-Sheet 2

INVENTOR
Pierre Alphonse Herreng
By: Haseltine, Lake & Co.
AGENTS

United States Patent Office 2,696,555

Patented Dec. 7, 1954

2,696,555

SIGNAL TRANSLATING APPARATUS FOR PULSE CODE TRANSMISSION SYSTEMS

Pierre Alphonse Herreng, Montrouge, France, assignor to Societe Alsacienne de Constructions Mecaniques, a corporation of France

Application June 28, 1951, Serial No. 234,102

Claims priority, application France July 13, 1950

1 Claim. (Cl. 250—27)

This invention relates to decoding devices used in systems for the distant transmission of an intelligence wave by pulse code modulation.

It is known that, in such systems, transmission is effected by transmitting recurrent pulse groups, each of the pulses in one group being of one of two possible signalling conditions (for example its presence or its absence), and each group carrying the indication of the instantaneous amplitude at a given instant of the intelligence wave to be transmitted. It is known that by means of groups of an integer number $n$ of pulses of this type, $2^n$ discrete and different instantaneous amplitudes may be represented, each one of the said different amplitudes corresponding to one different group.

Various methods are already known, by means of which it is possible to make the said $2^n$ amplitudes correspond to the $2^n$ possible groups.

According to the well-known "binary" method, each pulse of one group represents, by its signalling condition, a reference value equal to a fraction of a maximum amplitude. The reference values thus selected may be transmitted in any order.

According to a more general method, each one of the amplitudes still corresponds to one single of the $2^n$ possible groups of $n$ pulses, but the correspondence law is a completely arbitrary one.

Numerous signal translating apparatus are already known for decoding received code groups and for translating them into an intelligence wave. Such known apparatus intended for use in transmission systems employing the "binary" method, are much simpler than those which may be used in systems employing the more general coding method referred to above.

Accordingly, it is an object of the present invention to provide a simple decoder operating according to the "binary" coding method, but employed in the receiver of a transmisison system using the above mentioned more general coding method.

A decoder embodying the present invention provides, it its output and for each group of pulses, a single pulse having an amplitude which is different for each of the various groups. The decoder operates according to a selected "binary" law so that the amplitudes of the pulses which are obtained are generally different from the amplitudes represented by the groups of pulses; that is, for each of the groups of pulses there is a corresponding amplitude determined according to the coding law selected at the sending or transmitting end of the system, and also another corresponding amplitude determined according to the "binary" decoding law which is employed at the receiving end of the system, the correspondence law between these two amplitudes being proper for each group of pulses. Therefore, a translating device is used for restoring their original values to the amplitudes.

According to a feature of the invention, there is provided a storing device for storing the amplitudes of the "binary" decoded pulses for a predetermined time interval sufficient to permit the performance of the further operations hereinafter described.

The transformation of the amplitudes of the pulses, obtained by decoding the groups, into pulses modulated in accordance with the original amplitudes of the intelligence wave is effected, in devices embodying the present invention, by means of a special electronic beam valve or tube which operates to directly convert the amplitude of an electrical voltage which is proportional to the stored amplitudes of the decoded pulses issuing from the "binary" decoder, as mentioned above, into "length" or duration modulated pulses which are thereafter demodulated by known means.

Such a special electronic beam valve or tube comprises means for projecting a focussed beam of electrons, two perpendicularly arranged pairs of deflecting electrodes, a mask electrode having a series of apertures of different sizes arranged in a row, and a target or collector electrode positioned to collect the electrons passing through the series of apertures.

In accordance with a feature of the present invention, the apertures in the mask electrode are rectangular and extend parallel to each other in the direction of deflection of the electron beam caused by one of the pairs of deflecting electrodes, with the length of each aperture being proportional to a related one of the $2^n$ initial amplitudes represented by the groups of pulses from which the "binary" decoder creates pulses of different amplitudes.

Finally, the signal translating apparatus embodying the present invention comprises means for converting the pulses collected by the target or collector electrode into a signal wave having amplitudes varying continuously with time.

Thus, the present invention provides a signal translating apparatus which may be applied to a system transmitting information over substantial distances by pulse code modulation, and which makes it possible to cause the pulse groups to correspond to the amplitudes they represent in accordance with a most general code.

The present invention will be more particularly described with reference to the accompanying drawings forming a part hereof and wherein.

Figure 1:
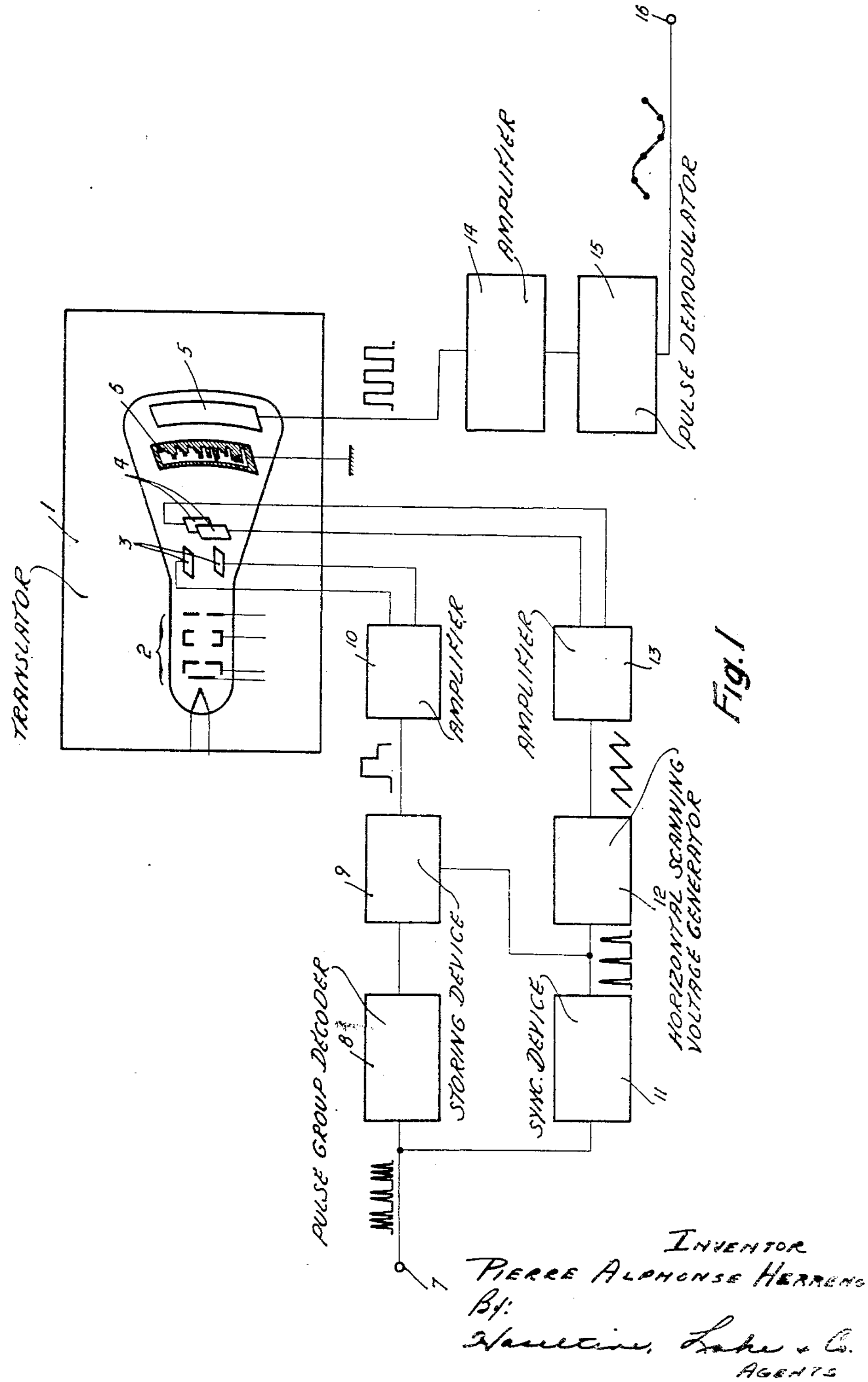
Fig. 1 is a diagrammatic illustration of a signal translating apparatus embodying the present invention.

Referring to the drawings and in particular to Figure 1, there is illustrated a translator valve 1, which is an electron beam valve derived from a well known type and containing an arrangement of special electrodes having particular shapes. In the valve 1 there is illustrated diagrammatically a normal device 2 employed for the production of a narrow electron beam, a so-called electron gun, two usual deflecting plate arrangements 3 and 4 for vertical and horizontal deflection, an anode or electron collector 5 and an auxiliary anode 6 which, for reasons which will appear hereinafter is called a "mask." The mask 6 is placed in the path of the electrons, between the deflection plates 3 and 4 and the anode 5. The mask 6 is provided with an aperture, the shape of which will be explained hereinafter and situated in such a manner that, according to the trajectory imposed on the electron beam by the voltages applied to the deflection plates 3 and 4, the electrons are collected either by the mask 6 itself when the impact of the beam occurs on its solid portion or by the collecting anode 5 when the beam goes through the aperture in the mask. Groups of coded pulses received by a device (not illustrated), are applied to the device represented by means of terminals 7. 8 illustrates a pulse group decoder of a type known per se, to which the pulse groups are applied, and which restores at its output amplitude modulated pulses having intermediate amplitudes as above explained. 9 represents a storing device to which the amplitude modulated pulses are applied, which stores, for the time separating two successive such pulses, the peak amplitude of the said pulses (for instance in the shape of a constant charging voltage). 10 represents an amplifier such as generally employed for the voltage supply of the deflecting plates 3 of the valve 1. 11 illustrates a synchronizing device of any known type, which, being bound to the rhythm of arrival of the code pulse groups, itself controls the operation of the whole device illustrated at the said rhythm. 12 illustrates a horizontal scanning voltage generator for the valve 1, such as is generally employed, bound with the synchronizing device 11 and supplying voltage to the horizontal deflecting plates 4 through the medium of a usual amplifier 13. 14 illustrates an amplifier which amplifies the pulses obtained in the outer circuit of the anode 5 of valve 1. 15 represents a pulse demodulator transforming the said pulses into a signal whose amplitude varies in a continuous manner and 16 represents the output terminals by means of which the restored intelligence wave is transmitted to an employment circuit, not illustrated.

Figures 2, 3:
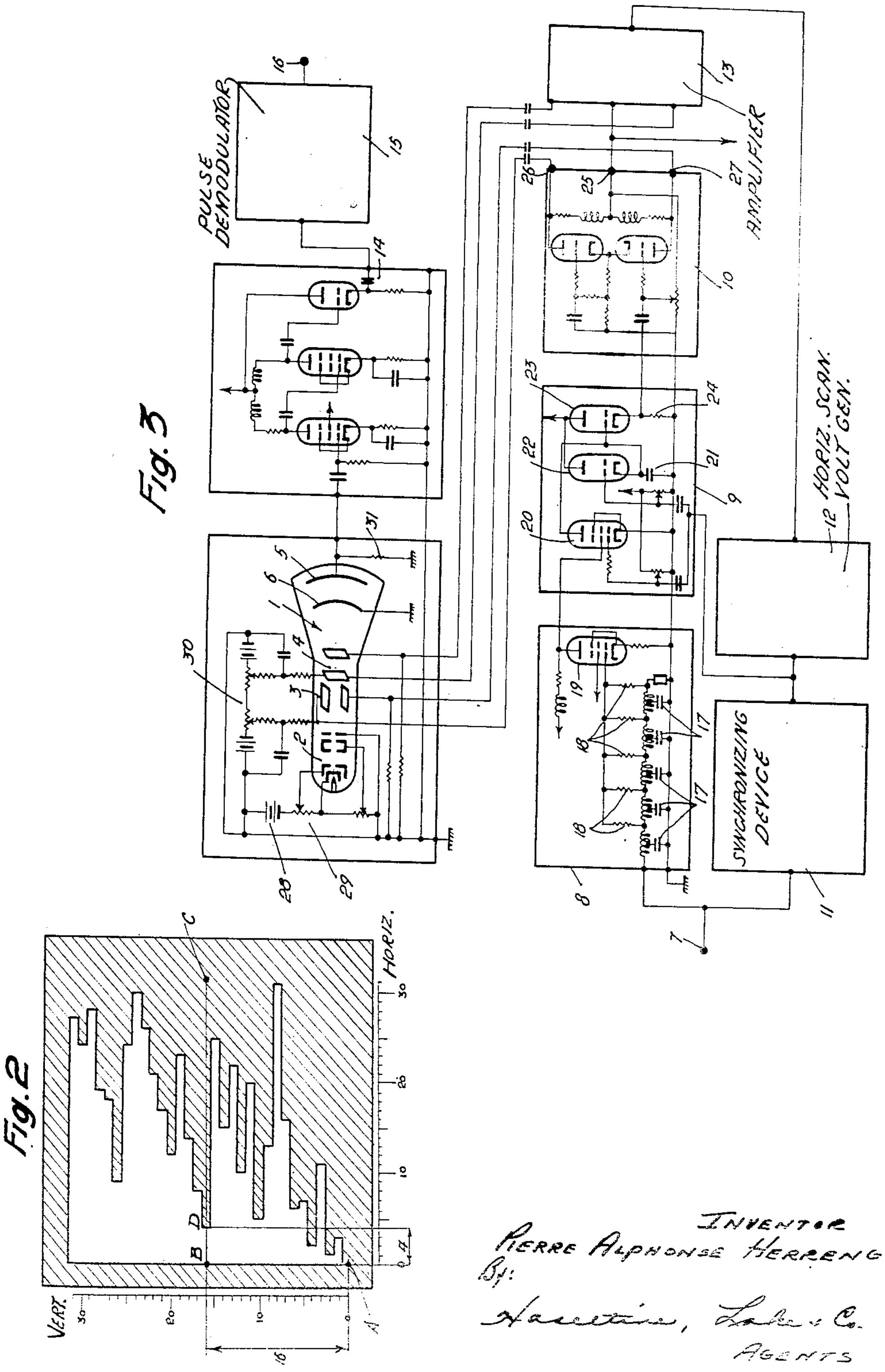
Fig. 2 is a detail view of a mask electrode forming a part of a special electron beam tube used in apparatus embodying the present invention.
Fig. 3 is a detail wiring diagram of a signal translating apparatus embodying the present invention.

Figure 2 illustrates, in a more detailed manner, the mask 6 of the valve 1 illustrated in Figure 1. In Figure 2 the shaded portion illustrates the solid part of that mask 6 and the unmasked central portion represents the cut out part through which the electronic beam can pass. V and H respectively represent two scales which have been added to facilitate the description of the operation of the said electrode.

The device illustrated in Figures 1 and 2 operates as follows:

Groups of code pulses arrive at the input terminals 7 at a predetermined rate. These groups are applied to the decoder 8 which restores pulses—one for each group—the amplitudes of which, called intermediate amplitudes, depend on the constitution of each group. The correspondence between the said intermediate amplitudes and the group constitutions results from the convention employed in the decoder 8, a convention according to which, as set forth above, there is made to correspond, to each pulse in one group, and for one of its signalling conditions (if it is present, for instance), a predetermined reference amplitude value, the amplitude of the pulse restored by the decoder being the sum of the individual amplitudes assigned to the pulses present in the corresponding group. These pulses are applied to the storing device 9 which is synchronized by the device 11 on the rate of group reception and which restores, in the shape of a charging voltage or in any other suitable electrical shape, a stepwise variable wave, each step of which has an amplitude proportional to that of the pulse which produced it, and ensures the storing of the said amplitude during the time separating two pulses, and, consequently two consecutive groups. This wave is applied to the amplifier 10 which transmits to the vertical deflection plates 3 of the valve 1, an amplified stepwise voltage wave.

The electrodes of the valve 1 are energized in the usual manner by fixed voltage sources, not illustrated, the voltages of which are so adjusted that, at rest, the impact of the electron beam occurs on the solid portion of the mask 6 at a point such as illustrated at A (Figure 2). The application to the plates 4 of one step of the above wave brings this impact to a point such as B (Figure 2).

The initial point A has been made to correspond to the zero of the H and V scale illustrated in Figure 2. The latter have been divided into 32 intervals, by way of example, numbered from zero to 31, which corresponds to the case of code groups, of five pulses, supplying 32 distinct combinations. It has been assumed in Figure 2, that the amplitude of the step was the sixteenth intermediate amplitude out of the thirty-two possible amplitudes and this value has been indicated at B on Figure 2.

During the time of application of the voltage step to the plates 3, the scanning generator 12, synchronized also by the device 11, applies, through the amplifier 13, to the horizontal deflection plates 4 of the valve 1, a linearly increasing scanning voltage followed by a very rapid return. Consequently, the electron beam moves horizontally and its path on the mask 6 moves at a constant speed from point B to point C (Figure 2).

During a portion of this displacement, variable for the various steps, the beam goes through the cut out portion of the mask 6 and, during this time, is received by the anode 5 in the outer circuit of which is collected an electric pulse having a variable duration. The shape of the cut out portion in the mask 6 is such that it sets up a correspondence, in a univocal manner, between a duration and each one of the possible vertical positions of the beam. In the case of Figure 2, it causes the intermediate amplitude 16 to correspond to a duration of the value shown at HD, that is 4 units of the H scale.

The cut out portion of the mask 6, thus consists of a juxtaposition of horizontal windows of a fixed width, whose number is equal to that of the possible pulse combinations in the received groups. The lengths of these windows are all different and proportional to the original instantaneous amplitudes of the intelligence wave which gave rise to the pulse groups. The shape of the cut out portion thus depends, firstly, on the correspondence law between the said instantaneous amplitudes and the pulse groups, a law which may have been selected in any manner, and, secondly, on the convention assumed in the decoder 8.

The variable duration pulses supplied by the valve 1 are amplified by the amplifier 14, demodulated in the demodulator 15, which may consist of a simple low pass filter, according to usual practice, and which restores a signal wave whose amplitude varies in a continuous manner. This wave restores the intelligence wave which had given rise to tne pulse groups; it may be transmitted through the output terminals 16 to any employment circuit.

Figure 3 illustrates, in a more detailed manner and by way of example the essential elements of a receiving device of the type represented symbolically in Figure 1 in which the received groups contain 5 pulses. To facilitate the understanding of Figure 3, the elements designated by 1 to 16 in Figure 3 are designated by the same numerals as in Figure 1.

In the decoder 8, which is of a conventional type, there is provided a 5 section delay network 17, the partial delay applied to the pulses in each section being equal to the time which separates two successive pulses in one group; resistances 18, a pentode valve 19 the grid of which is energized by the voltage developed at the terminals of the resistance assembly 18.

20 is a pentode valve, the screen grid of which is energized by the voltage, across the anode load impedance of the valve 19 and whose control grid, raised, at rest, to a highly negative voltage, is excited during brief instants by directing pulses supplied at the rate of arrival of the pulse groups and with the suitable phase by the synchronizing device 11 which has not been illustrated in detail. The anode of valve 20 is loaded by a condenser 21 and by the cathode conductance of a triode valve 22 whose grid, raised at rest to a highly negative voltage, is excited at the same time as that of the valve 20, by the directing pulses supplied by the device 11.

A triode valve 23 is excited by its grid, by the voltage across the condenser 21 and is loaded in its cathode circuit, by a resistance 24.

10 represents an amplifier of a conventional type which, excited by the voltage across the resistance 24, delivers two voltages of opposite signs respectively across the terminals 25—26 and 25—27. The terminals 26 and 27 are connected with the vertical deflection plates 3 of the valve 1. The electrodes of the valve 1 are supplied with voltages in the usual manner, by a source of direct voltage 28 and a potentiometer device 29. There is illustrated at 30 a device whereby it is possible to adjust the voltage, at rest, on the deflection plates 3 and 4, that is, the rest position for the electron beam.

A resistance 31 is inserted in the circuit of the anode 5 of the valve 1.

14 represents a three stage amplifier of the usual type, which amplifies the voltage variations collected at the terminals of the resistance 31.

The device thus described operates in the following manner:

The pulse groups arrive successively at the input to the delay network 17. At the time when the peaks of the pulses of one group are at the junction points of the resistances 18, a directing pulse supplied by the device 11 excites, during a very short instant, the valves 20 and 22 which are unblocked; the anode current of the valve 20 and the apparent conductance of the anode-cathode space of the valve 22 pass from a zero to a finite value. The voltage drop caused in this conductance by the anode current of the valve 20 charges, in a practically instantaneous manner, the condenser 21.

The charging voltage of the condenser 21 is proportional to the anode current in the valve 20, which is, in turn, proportional to the voltage on its control grid. This voltage is itself proportional to the control grid voltage of the valve 19. This voltage is determined by the resulting voltage drop caused in the whole of the resistances 18 by the voltages of the pulses stepped within the delay network 17 as has been described and claimed in United Kingdom patent application No. 27,884 of 1949 which was filed on October 31, 1949, in the names of Louis Marie Libois and Paul François Marie Gloess.

It is known, from the said patent, that the values of resistances 18 can be selected in such a manner that the voltage drop in the whole of these resistances be proportional to the sum of the values arbitrarily assigned to each pulse in one group.

In accordance with the present invention, the said resistances are therefore dimensioned in such a manner that the voltage applied to the control grid of the valve 19 be proportional to the intermediate amplitude assigned to the pulse group, according to the arbitrary convention made in accordance with the present invention.

The charging voltage for the condenser 21 is therefore proportional to the intermediate amplitude assigned to the pulse group positioned in the network 17. After the disappearance of the directing pulse, the valves 20 and 22 are again blocked and the condenser 21 remains charged to the above indicated voltage until the arrival of a new directing pulse supplied by the device 11 after the arrival of the next pulse group.

This voltage is proportionally amplified by the valve 23 and by those of the amplifier 10. A voltage, proportional to the intermediate amplitude assigned to the pulse group is thus applied to the vertical deflection plates 3 of the translator valve 1, and this voltage causes a vertical deflection of the path of the electron beam on the mask 6, also proportional to the intermediate amplitude of the group. The amplifications of the device are adjusted in such a manner that the path of the beam be displaced vertically by a number of units, measured on the V scale in Figure 2, equal to the said intermediate amplitude.

The directing pulse causes, during the time when the condenser 21 retains its charging voltage, the application, to the horizontal deflection plates 4 of the translator valve 1, of a linearly increasing voltage caused by the scanning generator 12. This voltage causes the horizontal displacement of the path of the electron beam which scans the mask 6.

During this scanning, the beam goes through the cut-out portion of the mask 6. It is collected, during this time, by the anode 5. As explained in connection with Figure 2, there is obtained, due to the shape of the cut out portion of the mask 6, at the terminals of the resistance 31, a current pulse whose duration is equal to the final amplitude of the pulse group; measured on the N scale of Figure 2.

This current pulse is amplified in the proportional amplifier 14 and transmitted to the demodulator 13.

The same operations are repeated for each pulse group successively received and positioned in the network 17; the condenser 21 successively assumes, under the action of the direction pulses supplied by the device 11 at a suitable rhythm, charge voltages proportional to the intermediate amplitudes corresponding to each group and the translator valve 1, converts these amplitudes into pulses of variable duration proportional to the final amplitudes, that is, to the amplitudes of the signal wave transmitted.

The demodulator 15 which may be a simple low-pass filter, receives a sequence of duration modulated pulses and supplies a signal wave whose amplitude varies in a continuous manner, which restores the signal wave transmitted to the approximation which results from the quantification of the amplitudes by the five pulse code into thirty two discrete values.

In the above description, associated with Figures 1, 2 and 3, the principle of intermediate decoding and translation of the intermediate amplitudes into final amplitudes by the translator valve were explicited. In order to illustrate these principles, the conventions will now be indicated which, in a particular case, load, for the cut-out portion of the mask 6 to the particular shape which is illustrated in Figure 2.

There has been represented, in the following table, firstly, the code employed for translating, in the transmission device to which the above described receiving device may be associated, thirty two discrete amplitudes of a signal wave to be transmitted into thirty two combinations of five pulses. The numeral zero represents a non transmitted pulse, and the numeral 1 a transmitted pulse. The table has been limited to the first amplitude values, for brevity:

| Amplitude to be coded: | Pulse combination |
|---|---|
| 0 | 00000 |
| 1 | 00001 |
| 2 | 00010 |
| 3 | 00100 |
| 4 | 01000 |
| 5 | 10001 |

The convention has then been made that the decoder 8 would operate according to the following convention: The presence of the first pulse in a received group means 8, the second 18, the third 1, the fourth 4 and the fifth 2. To this effect, five resistances 18 are employed in the decoder 8, the values of which are in a geometrical progression of ratio 2 and placed in order of their increasing values in the positions 3, 5, 4, 2 and 1 from the input to the delay network 17.

The amplitude 4 of the transmitted signal corresponds (table 1), to the pulse combination 01000, hence the sending of the second pulse alone. In the decoder 8, the conventional value 16 is assigned to this second pulse; the decoder 8 therefore, supplies the intermediate amplitude 16. The value 16 read on the V scale, corresponds actually with the value 4 read on the H scale as will be seen on reference to Figure 2.

The amplitude 5 of the transmitted signal would correspond to the combination 10001, hence the sending of the first and fifth pulses, to which are assigned the values 8 and 2 in the decoder 8 which, therefore, supplies the intermediate amplitude 10. It will be seen that the value 10 read on the V scale, corresponds actually to the value 5 read on the H scale.

The shape of the cut out portion of the mask 6 is thus determined.

The present invention renders it possible to realize decoding devices which operate at a high speed. Their employment is therefore particularly indicated in multiple transmission systems. In such systems, it is then possible to apply to the decoder a sequence of pulse groups which have been generated by several independent signallings associated by a time distribution according to a well known principle. The operation of the devices described is not modified; it is only necessary, at the output from the translator valve, to transmit the duration modulated pulses in a synchronized distributor which separates the pulses belonging to the various channels and directs them towards individual demodulators.

I claim:

In a tele-communication system wherein a given number of different possible amplitude values periodically sampled out of an intelligence wave to be transmitted are respectively represented by an equal number of coded electron pulse groups of different compositions and each including a fixed number of pulses which may individually be present or absent according to an arbitrary correspondence law between said amplitude values and compositions, and wherein said pulse groups are successively transmitted at recurring time intervals, a receiving apparatus comprising: a binary decoder translating each successively received coded pulse group into an intermediate voltage, each possible value of which corresponds to a different one of said possible amplitude values; means for storing said intermediate voltage during at least part of the time interval separating said translating of said received group from the translating of the next received group; an electron discharge tube including means for emitting an electron beam, a first pair and a second pair of deflecting electrodes positioned to deflect said beam in a first and a second mutually perpendicular direction, a mask electrode positioned across the path of said beam beyond said electrodes and provided with apertures of uniform height and spacing arranged in a row along said first direction, and of different lengths along said second direction according to their rank in said row, and a collector electrode positioned beyond said mask electrode for collecting electrons of said beam after passing through said apertures; means for applying to said first pair of deflecting electrodes a voltage proportional to said intermediate voltage so as to position said beam opposite one of said apertures having a rank proportional to the value of said intermediate voltage; means for applying at recurring time intervals to said second pair of deflecting electrodes a scanning voltage so as to cause said beam to scan said one of said apertures in said second direction; an external circuit connected to said collector electrode; and means for filtering variable duration signals received in said external circuit so as to transform them into a signal of continuously variable amplitude; the individual lengths of said apertures according to their rank in said row being proportional to the sampled amplitude value of said intelligence wave represented by said intermediate voltage.

References Cited in the file of this patent

UNITED STATES PATENTS

| Number | Name | Date |
|---|---|---|
| 2,144,337 | Koch | Jan. 17, 1939 |
| 2,473,691 | Meacham | June 21, 1949 |
| 2,524,708 | Levy | Oct. 3, 1950 |
| 2,530,538 | Rack | Nov. 21, 1950 |